United States Patent
Koodli et al.

(10) Patent No.: US 10,506,487 B2
(45) Date of Patent: Dec. 10, 2019

(54) SYSTEM AND METHOD FOR SEAMLESS MOBILITY OF USER SESSIONS WITH MULTI-ACCESS CONNECTIVITY

(71) Applicant: Google LLC, Mountain View, CA (US)

(72) Inventors: Rajeev Koodli, Sunnyvale, CA (US); Hassan Sipra, San Jose, CA (US); Dutt Kalapatapu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/388,351

(22) Filed: Dec. 22, 2016

(65) Prior Publication Data

US 2017/0223593 A1    Aug. 3, 2017

Related U.S. Application Data (60) Provisional application No. 62/288,335, filed on Jan. 28, 2016.

(51) Int. Cl.
*H04W 36/00* (2009.01)
*H04W 36/18* (2009.01)
(Continued)

(52) U.S. Cl.
CPC ........... *H04W 36/18* (2013.01); *H04W 36/00* (2013.01); *H04W 36/0088* (2013.01);
(Continued)

(58) Field of Classification Search
CPC ............. H04W 36/0088; H04W 36/04; H04W 36/165; H04W 36/18; H04W 36/30;
(Continued)

(56) References Cited

U.S. PATENT DOCUMENTS 8,644,247 B2 * 2/2014 Madour ............ H04W 36/0016
370/331
9,451,491 B2 * 9/2016 Das ........................ H04L 47/10
(Continued)

FOREIGN PATENT DOCUMENTS

EP          1925127 B1    1/2013
JP       2000-183973 A    6/2000
(Continued)

OTHER PUBLICATIONS

International Preliminary Report on Patentability under Chapter II dated Feb. 9, 2018 in International Application No. PCT/US2016/068282.

(Continued)

*Primary Examiner* — Mahendra R Patel
(74) *Attorney, Agent, or Firm* — Lerner, David, Littenberg, Krumholz & Mentlik, LLP (57) ABSTRACT

Systems and methods for maintaining a user session during an access network handover are provided. The method can include establishing, between a user equipment and an access network, a first connection over a first access network, and a second connection over a second access network such that the first and second connections exist concurrently. The method can include setting the first connection as an active connection for conveying data packets for stateful user session, and setting the second connection as a standby connection. The method can include exchanging a series of handover messages between the user equipment and the access gateway. The method can include transitioning the active connection to the second connection, and setting the first connection to the standby connection. The method can include continuing, over the second connection, the stateful user session such that a state of the stateful user session is maintained through the transition.

17 Claims, 6 Drawing Sheets

(51) Int. Cl.
*H04W 36/04* (2009.01)
*H04W 36/16* (2009.01)
*H04W 36/30* (2009.01)
*H04W 88/02* (2009.01)
*H04W 88/16* (2009.01)

(52) U.S. Cl.
CPC ......... *H04W 36/04* (2013.01); *H04W 36/165* (2013.01); *H04W 36/30* (2013.01); *H04W 88/02* (2013.01); *H04W 88/16* (2013.01)

(58) Field of Classification Search
CPC ... H04W 60/005; H04W 88/02; H04W 88/16; H04W 36/00; H04W 36/16; H04W 24/00; H04W 80/04; H04W 88/06; H04L 69/14
USPC ..... 455/442, 436, 452.1; 370/331, 252, 229; 726/4
See application file for complete search history.

(56) References Cited

U.S. PATENT DOCUMENTS

| | | | | |
|---|---|---|---|---|
| 2002/0057657 | A1* | 5/2002 | La Porta | H04W 8/085 370/331 |
| 2004/0121777 | A1* | 6/2004 | Schwarz | H04W 36/22 455/452.1 |
| 2006/0104262 | A1* | 5/2006 | Kant | H04W 76/10 370/352 |
| 2006/0126565 | A1* | 6/2006 | Shaheen | H04W 36/04 370/331 |
| 2008/0287129 | A1* | 11/2008 | Somasundaram | H04W 36/0055 455/436 |
| 2008/0311911 | A1* | 12/2008 | Koodli | H04W 36/0066 455/436 |
| 2009/0201878 | A1* | 8/2009 | Kotecha | H04W 36/0033 370/331 |
| 2010/0130189 | A1* | 5/2010 | Morrison | H04W 48/20 455/422.1 |
| 2011/0051689 | A1 | 3/2011 | Premec et al. | |
| 2012/0163219 | A1* | 6/2012 | Lee | H04W 60/005 370/252 |
| 2012/0264429 | A1* | 10/2012 | Takizawa | H04W 36/14 455/436 |
| 2012/0294276 | A1 | 11/2012 | Jaiswal et al. | |
| 2013/0097674 | A1* | 4/2013 | Jindal | H04L 63/0876 726/4 |
| 2013/0279470 | A1 | 10/2013 | Sen et al. | |
| 2014/0126532 | A1* | 5/2014 | Bapat | H04W 76/25 370/331 |
| 2014/0355536 | A1* | 12/2014 | Muley | H04W 28/0215 370/329 |
| 2015/0163811 | A1* | 6/2015 | Konstantinou | H04W 76/16 370/329 |
| 2016/0219475 | A1* | 7/2016 | Kim | H04L 5/00 |

FOREIGN PATENT DOCUMENTS

| | | |
|---|---|---|
| JP | 2005-500760 A | 1/2005 |
| JP | 2009-513086 A | 3/2009 |
| JP | 2009-213108 A | 9/2009 |
| JP | 2012-514949 A | 6/2012 |
| JP | 2014-510485 A | 4/2014 |
| KR | 1020070108900 | 11/2007 |
| WO | 2004014007 A2 | 2/2004 |
| WO | 2008098194 A2 | 8/2008 |

OTHER PUBLICATIONS

Combined Search and Examination report dated Jun. 7, 2017 in UK Patent Application No. 1622377.8.
3GPP, The Mobile Broadband Standard. "Evaluation-related Small Cell Enhancements SID Clarifications," Samsung R1-130297, 3GPP TDocs (written contributions) at meeting Jan. 28-Feb. 1, 2013, Malta. Retrieved from URL: http://www.3gpp.org/ftp/tsg_ran/WG1_RL1/TSGR1_72/Docs/R1-130297.zip on Jun. 14, 2017.
International Search Report and Written Opinion dated Mar. 7, 2017 in PCT Application No. PCT/US2016/068282.
Office Action dated Sep. 10, 2018 in United Kingdom Patent Application No. 1622377.8.
Office Action dated Sep. 11, 2018 in Canadian Patent Application No. 3,009,498.
Office Action dated May 4, 2018 in UK Patent Application No. 1622377.8.
Office Action dated Jan. 15, 2019 in Japanese Patent Application No. 2018-529204, and English translation thereof.
Office Action dated Oct. 4, 2018 in German Patent Application No. 102016125873.3, and English translation thereof.
Office Action dated Nov. 15, 2018 in United Kingdom Patent Application No. 1622377.8.
Office Action dated Dec. 5, 2018 in Korean Patent Application No. 10-2018-7021901, and English translation thereof.

* cited by examiner

SYSTEM AND METHOD FOR SEAMLESS MOBILITY OF USER SESSIONS WITH MULTI-ACCESS CONNECTIVITY

RELATED APPLICATIONS

The present application claims priority to U.S. Provisional Patent Application No. 62/288,335, titled "METHOD AND APPARATUS FOR SEAMLESS MOBILITY OF USER SESSIONS WITH MULTI-ACCESS CONNECTIVITY," and filed on Jan. 28, 2016, the entire contents of which are hereby incorporated by reference.

BACKGROUND

In mobile data networks, user equipment such as a mobile phone or other computing device, can communicate with an access gateway via one of a plurality of access networks. As conditions of the communication channel change—due to physical movement of the user equipment, signal interruptions, or interference—the mobile device may handover its connection from a first access network to a second access network. Such handovers, however, typically result in the reset of any stateful communications the user equipment is participating in.

SUMMARY

At least one aspect is directed to a system for maintaining a user session during an access network handover. The system includes an access gateway having a processor and a memory containing instructions. The instructions cause the access gateway to establish a first connection with a user equipment over a first access network. The instructions cause the access gateway to establish a second connection with the user equipment over a second access network such that the second connection and the first connection exist concurrently. The instructions cause the access gateway to set the first connection as an active connection for conveying data packets for a stateful user session between the access gateway and the user equipment. The instructions cause the access gateway to set the second connection as a standby connection. The instructions cause the access gateway to exchange, with the user equipment over the active connection, a series of handover messages. The instructions cause the access gateway to transition, subject to completion of the series of handover messages, the active connection to the second connection. The instructions cause the access gateway to set the first connection as the standby connection. The instructions cause the access gateway to continue, over the second connection, the stateful user session between the access gateway and the user equipment such that a state of the stateful user session is maintained through the transition to the second connection.

In some implementations, the user equipment includes a first radio interface configured to connect to a small-cell network (SCN) and a second radio interface configured to connect to a macro cellular network (MCN).

In some implementations, the access gateway maintains a same IP address for the active connection over the first connection and through the transition to the second connection.

In some implementations, the access gateway includes a first interface storing a first user equipment context and communicating with the first access network, and a second interface storing a second user equipment context and communicating with the second access network, wherein: transitioning the active connection to the second connection comprises transferring the first user equipment context to the second interface.

In some implementations, the access gateway is configured to monitor the standby connection for messages.

At least one aspect is directed to a system for maintaining a user session during an access network handover. The system includes a user equipment having a processor and a memory containing instructions. The instructions cause the user equipment to establish a first connection with an access gateway over a first access network. The instructions cause the user equipment to establish a second connection with the access gateway over a second access network such that the second connection and the first connection exist concurrently. The instructions cause the user equipment to set the first connection as an active connection for conveying data packets for stateful user session between the user equipment and the access gateway. The instructions cause the user equipment to set the second connection as a standby connection. The instructions cause the user equipment to exchange, with the access gateway over the active connection, a series of handover messages. The instructions cause the user equipment to transition, subject to completion of the series of handover messages, the active connection to the second connection. The instructions cause the user equipment to set the first connection as the standby connection. The instructions cause the user equipment to continue, over the second connection, the stateful user session between the user equipment and the access gateway such that a state of the stateful user session is maintained through the transition to the second connection.

In some implementations, the user equipment includes a first radio interface configured to connect to a small-cell network (SCN) and a second radio interface configured to connect to a macro cellular network (MCN).

In some implementations, the user equipment includes a single radio interface, and transitioning the active connection to the second connection comprises retuning the radio interface to the second access network.

In some implementations, the user equipment communicates with the access gateway using a same IP address for the active connection over the first connection and through the transition to the second connection.

In some implementations, the user equipment is configured to monitor the standby connection for messages.

At least one aspect is directed to a method of maintaining a user session during an access network handover. The method includes establishing, by an access gateway, a first connection with a user equipment over a first access network. The method includes establishing, by the access gateway, a second connection with the user equipment over a second access network such that the second connection and the first connection exist concurrently. The method includes setting, by the access gateway, the first connection as an active connection for conveying data packets for a stateful user session between the access gateway and the user equipment. The method includes setting, by the access gateway, the second connection as a standby connection. The method includes exchanging, between the access gateway and the user equipment over the active connection, a series of handover messages. The method includes transitioning, subject to completion of the series of handover messages, the active connection to the second connection. The method includes setting, by the access gateway, the first connection as the standby connection. The method includes continuing, over the second connection, the stateful user session between the access gateway and the user equipment such that a state of the stateful user session is maintained through the transition to the second connection.

In some implementations, the method includes maintaining, by the access gateway, a same IP address for the active connection over the first connection and through the transition to the second connection.

In some implementations, the method includes monitoring, by the access gateway, the standby connection for messages.

In some implementations, exchanging the series of handover messages includes: incrementing, by the access gateway, a sequence number counter; sending, from the access gateway to the user equipment, a handover initiate message including a sequence number corresponding to a current state of the sequence number counter; receiving, at the access gateway from the user equipment, a handover acknowledge message including the sequence number, the user equipment sending the handover acknowledge message subject to a determination that the sequence number is greater than a previous sequence number included in a previously received handover initiate message; and accepting, by the access gateway, the handover acknowledge message subject to a determination that the sequence number is greater than a sequence number included in a previously received handover acknowledge message.

In some implementations, the method includes starting, by the access gateway upon transitioning the active connection to the second connection, a first timer having a first duration and a second timer having a second duration longer than the first duration; for a handover initiate message received from the user equipment via the standby connection prior to expiration of the first timer, sending a handover acknowledge message with a reject status-code; and for a handover initiate message received from the user equipment via the active connection prior to expiration of the second timer, sending a handover acknowledge message with a reject status-code.

At least one aspect is directed to a method of maintaining a user session during an access network handover. The method includes establishing, by a user equipment, a first connection with an access gateway over a first access network. The method includes establishing, by the user equipment, a second connection with the access gateway over a second access network such that the second connection and the first connection exist concurrently. The method includes setting, by the user equipment, the first connection as an active connection for conveying data packets for stateful user session between the user equipment and the access gateway. The method includes setting, by the user equipment, the second connection as a standby connection. The method includes exchanging, between the user equipment and the access gateway over the active connection, a series of handover messages. The method includes transitioning, subject to completion of the series of handover messages, the active connection to the second connection. The method includes setting, by the user equipment, the first connection as the standby connection. The method includes continuing, over the second connection, the stateful user session between the user equipment and the access gateway such that a state of the stateful user session is maintained through the transition to the second connection.

In some implementations, the method includes maintaining, by the access gateway, a same IP address for the active connection over the first connection and through the transition to the second connection.

In some implementations, the method includes monitoring, by the access gateway, the standby connection for messages.

In some implementations, exchanging the series of handover messages includes: incrementing, by the user equipment, a sequence number counter; sending, from the user equipment to the access gateway, a handover initiate message including a sequence number corresponding to a current state of the sequence number counter; receiving, at the user equipment from the access gateway, a handover acknowledge message including the sequence number, the access gateway sending the handover acknowledge message subject to a determination that the sequence number is greater than a previous sequence number included in a previously received handover initiate message; and accepting, by the user equipment, the handover acknowledge message subject to a determination that the sequence number is greater than a sequence number included in a previously received handover acknowledge message.

In some implementations, the method includes starting, by the user equipment upon transitioning the active connection to the second connection, a first timer having a first duration and a second timer having a second duration longer than the first duration. The method includes, for a packet received from the access gateway via the standby connection prior to expiration of the first timer, disregarding the packet. The method includes, for a packet received from the access gateway via the standby connection after expiration of the first timer, sending a handover acknowledge message with an appropriate status-code. The method includes, for a handover initiate message received from the access gateway via the active connection prior to expiration of the second timer, sending a handover acknowledge message with a reject status-code.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Systems and methods of this disclosure relate generally to seamless mobility of user sessions with multi-access connectivity. As mobile data network demand increases, service providers are increasing deployment of long-term evolution (LTE) networks in existing and emerging spectra in so-called small-cell networks (SCN). SCNs will co-exist with traditional macro cellular networks (MCN).

Another development is the projected availability of LTE Carrier Aggregation (LTE-CA), which can provide a user equipment (UE) access to more than one radio carrier. With LTE-CA, a system including MCNs and SCNs using different access network providers can provide multiple radio interfaces to the UE. To further capitalize on this new architecture, UEs with multiple LTE radio interfaces are expected to become available in the near future.

With a multi-access capable UE, a user can simultaneously connect to an SCN and an MCN. The configuration can provide several benefits including: a simplified model for enabling federation and mobility management between disjoint MCN and SCNs, high aggregate bandwidth per UE leading to better user experience, redundancy when a UE experiences poor connectivity or connection failures, and better aligning application needs with specific access networks (for example, running voice on MCNs and video on SCNs).

In a multi-access system, it is advantageous to handle mobility of stateful communications such as user sessions from one access network to another access network without disrupting the user experience. For example, consider a user engaged in a voice or video call via an MCN moving into a building where the MCN coverage is poor and capacity is lower. The connection quality may suffer or the call may disconnect. When an SCN is available, the call could be handed over from the MCN to improve the user experience. The systems and methods of this disclosure provide seamless mobility of a user session in a multi-access network environment. The seamless mobility can be provided with little or no need for coordination between access network elements.

The systems and methods can utilize a protocol for notifying path changes in communications between the UE and an access gateway providing access to a packet data network (PDN). The access gateway can assign an IP address to the UE on multiple access networks. Although the UE may be attached to multiple networks, it is assumed to be capable of accessing the Internet via only one access network at any given time. Connections to other access networks can remain inactive, idle, or on standby. The UE can choose to go inactive on the currently active connection and active on the currently inactive connection. In systems where the UE can toggle between inactive and active networks for accessing the Internet, the UE needs a way to indicate the chosen access network for communicating with the access gateway so that the access gateway may switch its forwarding path accordingly. This disclosure presents a signaling protocol for maintaining an active connection on a first access network and a standby connection on a second access network, and executing a handover of the active connection from the first access network to the second access network.

Figure 1:
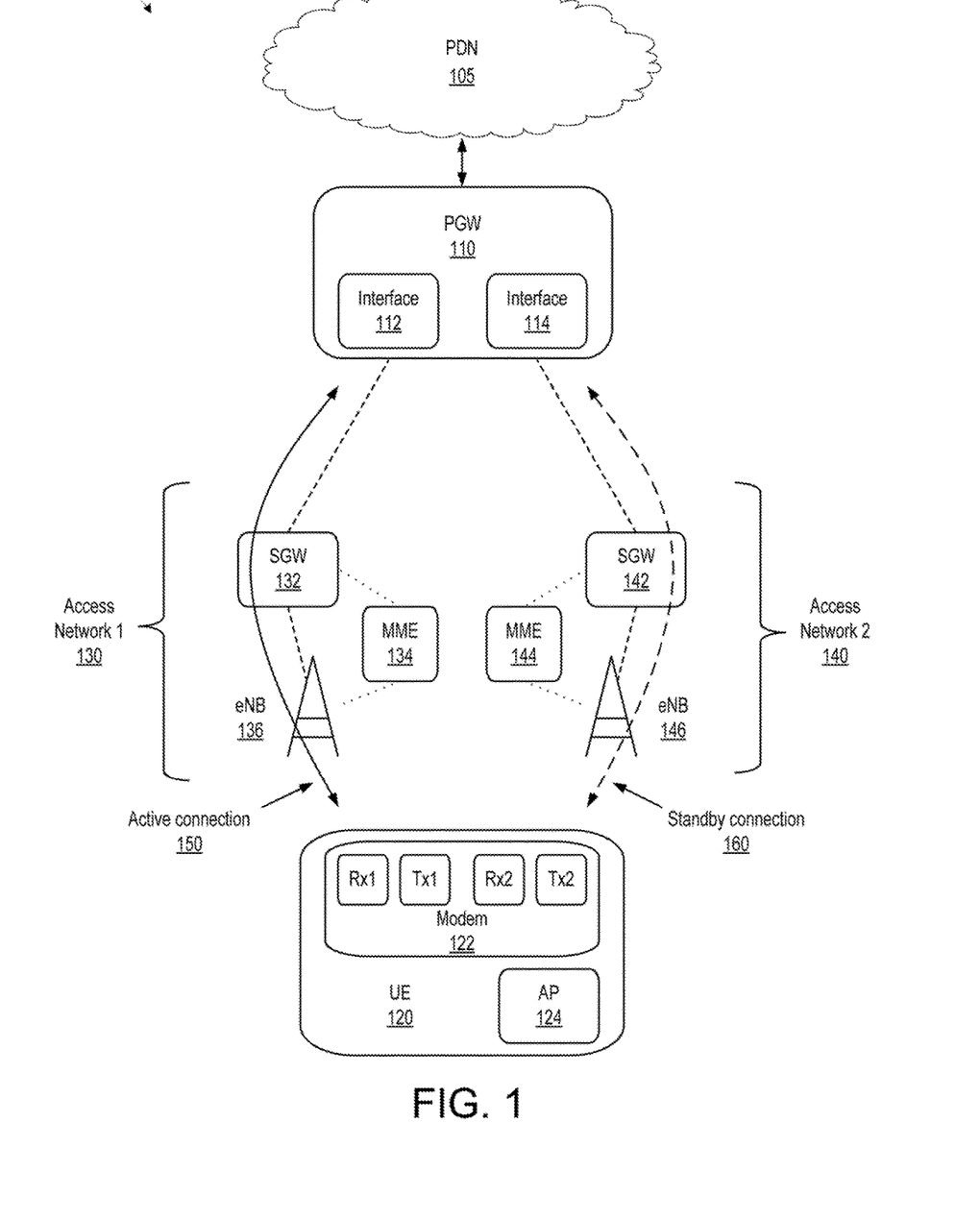
FIG. 1 is a block diagram of a system for maintaining a user session during an access network handover, according to an illustrative implementation.

FIG. 1 is a block diagram of a system 100 for maintaining a user session during an access network handover, according to an illustrative implementation. The system can provide a user equipment (UE) 120 access to a packet data network (PDN) 105 such as the Internet. The system includes an access gateway 110, such as a PDN gateway (PGW), and one or more access networks, such as access network 1 130 and access network 2 140. The access networks 130 and 140 provide connectivity between the UE 120 and the access gateway 110. The system 100 can conform to the System Architecture Evolution network architecture.

The access gateway 110 provides connectivity from the UE 120 to the external PDN 105. The access gateway 110 is the point of exit and entry of packet-based data traffic between the UE 120 and entities in and beyond the PDN 105. The access gateway 110 can enforce policies on data use, perform packet filtering, and allocate IP addresses for each UE 120. The access gateway 110 can have interfaces 112 and 114 for each access network 130 and 140, respectively. Each interface can maintain a UE context for each UE 120 connected via the access network associated with the interface. The UE context can include, for each connected UE 120, registration information, channel and frequency information, state information for communications between the UE 120 and the access gateway 110, and one or more sequence number counters and/or timers for enforcing handover policies. The access gateway 110 serves as the anchor for both of the access networks 130 and 140.

The access networks 130 and 140 include the infrastructure for conveying communications between the access gateway 110 and the UE 120. The access network 130 includes elements such as a serving gateway (SGW) 132, an eNodeB (eNB) 136, and a mobility management entity (MME) 134. The access network 140 includes elements such as a serving gateway (SGW) 142, an eNodeB (eNB) 146, and a mobility management entity (MME) 144. The MMEs 134 and 144 supports the interface between the respective SGW and eNB. The access networks 130 and 140 can be of different types. For example, each of the access networks 130 or 140 can be a macro cellular network (MCN) or a small-cell network (SCN). The access networks 130 and 140 can carry connections between the UE 120 and the access gateway 110. The connections can be active, such as the active connection 150, or inactive, such as the standby connection 160. The active connection 150 allows the UE 120 to communicate with entities across the PDN 105 via the access gateway 110. In contrast, the standby connection 160 allows the UE 120 to register with the access gateway 110 for the purpose of communicating messages between the UE 120 and the access gateway 110, but does not provide for communication between the UE 120 and the PDN 105. The standby connection 160 can, however, be used by the UE 120 and the access gateway 110 to communicate keep-alive and test messages, handover requests, and other commands or state information.

The UE 120 can be a stationary or mobile wireless device configured for packet-based communication over the system 100. The UE 120 can be a mobile phone, tablet, portable computer, wearable computing device, or any computing device having a wireless network adapter suitable for communicating over the access networks 130 and 140. The UE 120 includes an application processor (AP) 124 for controlling hardware and software functions of the UE 120. The UE 120 includes a modem 122 having a number of receivers (Rx) and transmitters (Tx). Each of the receivers and transmitters are capable of maintaining packet-based communications with the access gateway 110 via the access networks 130 and 140. The modem 122 can have one or more receivers and one or more transmitters. Based on the number of receivers and transmitters, the UE 120 may operate in one of three scenarios:

Scenario 1: The UE 120 has a single Tx and a single Rx. At any given time, the UE 120 is active and transferring data on a single access network—for example, the active connection 150 on access network 1 130—and is registered and idle on a second access network—for example, the standby connection 160 on access network 2 140. The modem 122 can tune the receiver Rx and the transmitter Tx to the access network 1 130 to communicate with the interface 112 of the access gateway 110. The modem 122 can thus communicate data packets over the PDN 105 via the access gateway 110. During moments of idle communication on the active connection 150, the modem 122 can retune the receiver Rx to the access network 2 140 to communicate with the interface 114 of the access gateway 110, and listen for system information transmitted by the access gateway 110. Following an active connection handover to access network 2 140, the modem 122 can set the Rx and Tx primarily to the now active connection 150 on access network 2 140, and periodically retune the Rx to the now standby connection on access network 1 130.

Scenario 2: The UE 120 has a single Tx and dual Rxs (Rx1, Rx2). At any given time, only one Rx is active. For example, the UE 120 can be active and transferring data on the active connection 150 via Rx1 and Tx, and registered and idle on a second access network via Rx2. The modem 122 is capable of receiving system information over the standby connection 160 via Rx2, and taking subsequent action. An active connection handover can occur by either switching the active Rx, or retuning each Rx. In some implementations, the modem 122 can set Rx2 as the active receiver and Rx1 as the standby receiver, where each Rx communicates with the same access network 130 or 140 as before. In some implementations, the modem 122 can retune Rx1 to the now active connection 150 on access network 2 140, and Rx 1 to the now standby connection on access network 1 130. In either case, the modem 122 can retune Tx to the now active connection 150 on access network 2 140.

Scenario 3: The UE 120 has dual Rxs (Rx1, Rx2) and dual Txs (Tx1, Tx2). At any given time, only one Rx, Tx pair is active. For example, the UE 120 can be active and transferring data on the active connection 150 via Rx1 and Tx1, and registered and idle on a second access network via Rx2 and Tx2. The UE 120 modem is capable of sending and receiving system information over the standby connection 160 via Tx2 and Rx2, and taking subsequent action. An active connection handover can occur via switching the active Rx and Tx, or retuning each Rx and Tx.

In each scenario, the system 100 can implement a signaling protocol for exchanging a series of handover messages between the UE 120 and the access gateway 110 to effect a handover of the active connection 150 from access network 1 130 to access network 2 140. The handover of the active connection 150 can be coordinated among the UE 120 and the access gateway 110 directly, without coordination among the elements of the access networks (i.e., the SGWs 132 or 142, the MMEs 134 or 144, or the eNBs 136 or 146). Using the signaling protocol, the system 100 can maintain a stateful user session during a handover of the active connection 140 such that the user session need not be refreshed or restarted, allowing the handover to appear seamless to a user of the UE 120. The 100 system can maintain the state of the stateful user session by transferring the UE context from the interface 112 associated with the previous active connection 150 to the interface 114 associated with the new active connection 150. The system 100 can maintain a standby connection 160 on the access network carrying the previously active connection 150. In some implementation, the system 100 can implement a sequence counter and/or one or more timers to prevent unwanted or overly frequent handovers. In some implementations, the access gateway 110 can maintain the same IP address for the UE 120 across the interfaces 112 and 114. In some implementations, the signaling protocol can make use of an application programming interface (API) that can process network requests (initiated by either the UE 120 or the access gateway 110) for handover of the active connection 150 to a different access network. Operation of the signaling protocol is described in detail below with regard to FIGS. 2-5.

Figure 2:
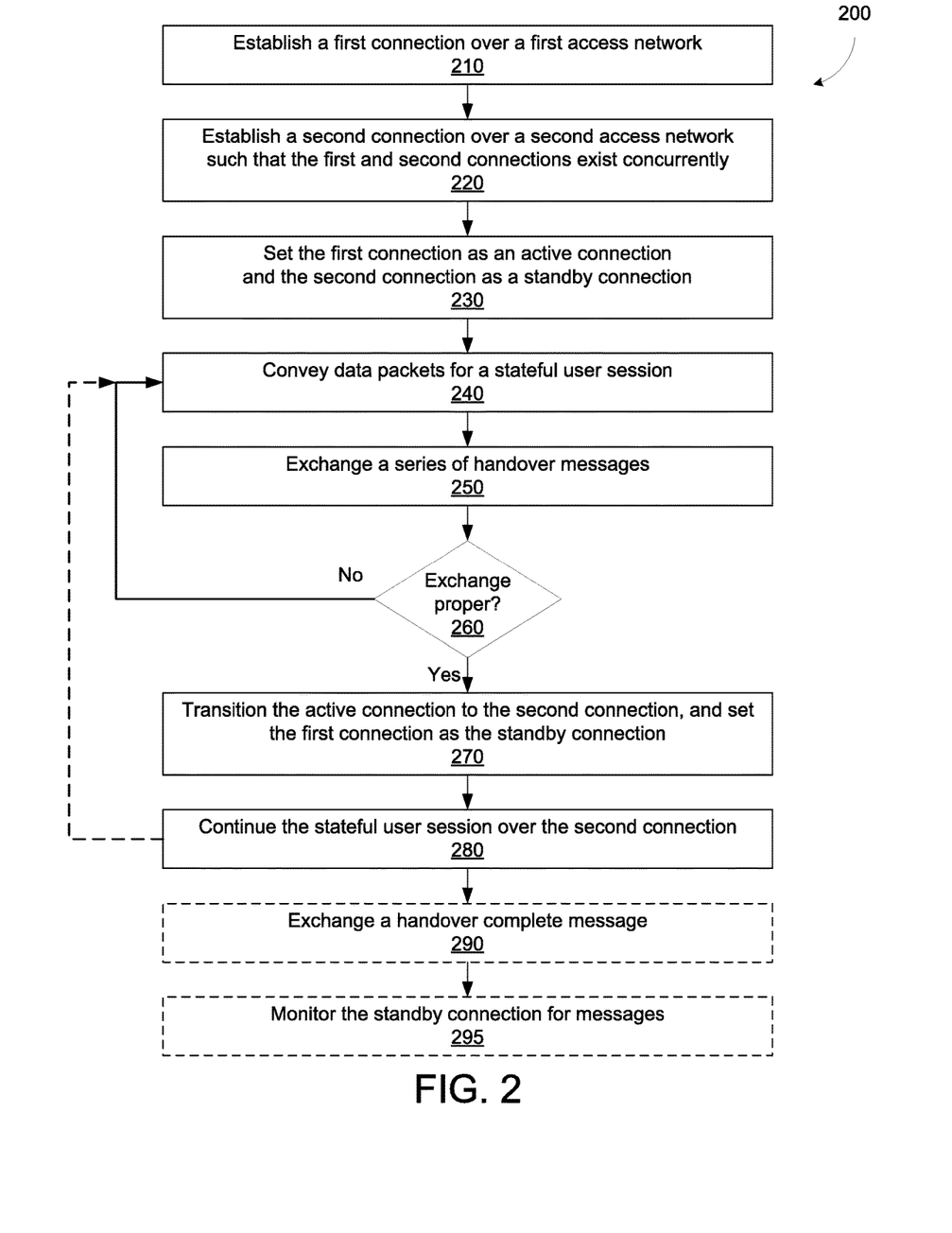
FIG. 2 is flowchart of an example method of maintaining a user session during an access network handover, according to an illustrative implementation.

FIG. 2 is flowchart of an example method 200 of maintaining a user session during an access network handover, according to an illustrative implementation. The method 200 includes establishing an first connection over a first access network (stage 210), establishing a second connection over a second access network such that the first and second connections exist concurrently (stage 220), setting the first connection as an active connection for conveying data packets for a stateful user session, and setting the second connection as a standby connection (stage 230), conveying data packets for a stateful user interaction (stage 240), exchanging a series of handover messages (stage 250), and determining that the handover message exchange is proper (decision block 260). If the handover message exchange is not proper, the method 200 returns to stage 240. If the handover message exchange is proper, the method 200 includes transitioning the active connection to the second connection, and setting the first connection as the standby connection (stage 270), continuing the stateful user session over the second connection (stage 280), optionally exchanging a handover complete message notifying the requesting device that the responding device is active on access network 2 140 (stage 290), and optionally monitoring the standby connection for messages (stage 295). The method 200 can be implemented symmetrically between the access gateway 110 and the UE 120. That is, either of the access gateway 110 and the UE 120 can establish connections, set the active connection, and initiate the handover request. Thus, for the purpose of the following description, the device that initiates the handover request will be referred to as the "requesting device," and the device that responds to the handover request will be referred to as the "responding device."

The method 200 includes establishing a first connection over a first access network (stage 210). The modem 122 of the UE 120 can attach to access network 1 130 and register with the interface 112 of the access gateway 110 to establish the first connection. The interface 112 can maintain the UE context for the active connection, thereby enabling a stateful user session over the first connection. The UE context can include registration information, channel and frequency information, state information for communications between the UE 120 and the access gateway 110. The AP 124 of the UE 120 can maintain similar information for maintaining the first connection.

The method 200 includes establishing a second connection over a second access network such that the first and second connections exist concurrently (stage 220). The modem 122 of the UE 120 can attach to access network 2 140 and register with the interface 114 of the access gateway 110 to establish the second connection. The interface 112 can maintain the UE context for the active connection, thereby enabling a stateful user session over the second connection. The AP 124 of the UE 120 can maintain similar information for maintaining the second connection.

The method 200 includes setting the first connection as an active connection for conveying data packets for a stateful user session, and setting the second connection as a standby connection (stage 230). Setting the first connection as the active connection allows the UE 120 to communicate with entities across the PDN 105 via the access gateway 110. The access gateway may assign an IP address to the first connection for use in exchanging data packets across the PDN 105. Setting the second connection as the standby connection allows the UE 120 to register with the access gateway 110 for the purpose of communicating messages between the UE 120 and the access gateway 110, but does not provide for communication between the UE 120 and the PDN 105. The standby connection can, however, be used by the UE 120 and the access gateway 110 to communicate keep-alive and test messages, as well as other commands or state information. The standby connection can be established before, simultaneously, or after the active connection is established.

The method 200 includes conveying data packets for a stateful user interaction (stage 240). With the active connection established, the UE 120 can commence and maintain a stateful user session with entities across the PDN 105. The stateful user session can include, without limitation, a TCP connection, a browsing session using a secure login, a voice-over-internet phone (VOIP) call, streaming media such as audio or video, or any other stateful communication.

The method 200 includes exchanging a series of handover messages (stage 250). The UE 120 or the access gateway 110 may detect a condition indicating that a handover of the active connection 150 may be appropriate. For example, one of the interfaces 112 or 114, or the modem 122, may receive data indicating that access network 1 130 is congested or otherwise disrupted. Accordingly, the UE 120 or the access gateway 110 may initiate the exchange of handover messages with a handover initiate message. The device that initiates the exchange of the handover messages is referred to below as the requesting device. The responding device may respond with a handover acknowledge message.

The method 200 includes determining that the handover message exchange is proper (decision block 260). The UE 120 and the access gateway 110 can exchange a handover initiate message and a handover acknowledge message over the active connection. If the requesting device sends a handover initiate message and receives a valid handover acknowledge message from the responding device, the requesting device can consider the handover message exchange proper. In some implementations, for the handover message exchange to be considered proper, the handover acknowledge message must include a status code of ACCEPT. If the handover acknowledge message includes a status code of REJECT, the handover exchange is deemed improper. In some implementations, the responding device can, prior to sending the handover acknowledge message, check to see whether the access network carrying the standby connection is exhibiting conditions favorable for carrying the active connection. An example sequence of events for executing a handover is described in more detail below with respect to FIG. 5. In some implementation, the UE 120 and the access gateway 110 can implement sequence counters and/or one or more timers to prevent unintentional handovers caused by rapidly repeated requests and messages received out of sequence due to transmission delays. An example method of using a sequence number scheme to avoid excessive access network handovers is described in more detail below with respect to FIG. 3. An example method of using timers to avoid excessive access network handovers is described in more detail below with respect to FIG. 4. If the requesting device determines that the handover message exchange was proper, the method 200 can proceed to stage 270. If the exchange was improper, the requesting device can ignore the messages and return to stage 240.

The method 200 includes transitioning the active connection to the second connection, and setting the first connection as the standby connection (stage 270). The requesting device can handover the active connection from the access network 1 130 to the access network 2 140, and the standby connection from access network 2 140 to access network 1 130. In some implementations, the requesting device can wait a pre-configurable amount of time after receiving the handover acknowledge message before switching the active connection to access network 2 140. During the handover, the access gateway 110 can transition the parameters of the UE context from the interface 112 to the interface 114. Similarly, the UE 120 can redirect its Rx and Tx from access network 1 130 to access network 2 140. In this manner, the stateful user session can be maintained despite the handover. Moreover, none of the elements of access network 1 130 or access network 2 140 need to be updated or modified in order to maintain continuity of the stateful user session through the handover.

The method 200 includes continuing the stateful user session over the second connection (stage 280). Because the UE context will be present at the interface 114 to which the UE 120 connects over the now active connection, the UE 120 can continue the stateful user session without refreshing or restarting the user session. The method 200 can return to stage 240 and continue conveying data packets for the stateful user session.

In some implementations, the method 200 can include exchanging a handover complete message notifying the requesting device that the responding device is active on access network 2 140 (stage 290). The responding device can send the handover complete message to the requesting device over access network 2 140. The handover complete message can provide a failover in the event that the handover acknowledge message is lost.

In some implementations, the method 200 can include monitoring, by the UE 120 and/or the access gateway 110, the standby connection for messages (stage 295). The messages can include keep-alive or heartbeat messages for checking the viability of the standby connection and the access network over which it is carried. The messages can include connection health or status messages that the UE 120 or the access gateway 110 can use to determine whether it may be appropriate to transfer the active connection back to the access network 1 130. In some implementations, the UE 120 can transmit keep-alive or diagnostic messages to the access gateway 110 over the standby connection. In some implementations, the messages can include a handover initiate message requesting a handover of the active connection back to access network 1 130. In some cases, the handover initiate message received over the standby connection could have been sent due to the requesting device detecting that active connection has gone offline. In some cases, the handover initiate message received over the standby connection could be the result of an earlier issued handover initiate message that was delayed in transit through the network. In order to minimize the possibility of unwanted handovers while allowing for handover requests over the standby connection, the system 100 can implement sequence number counters and/or request timers. The operation of the sequence number counters is described in more detail below with respect to FIG. 3. The operation of the request timers is described in more detail below with respect to FIG. 4.

Figure 3:
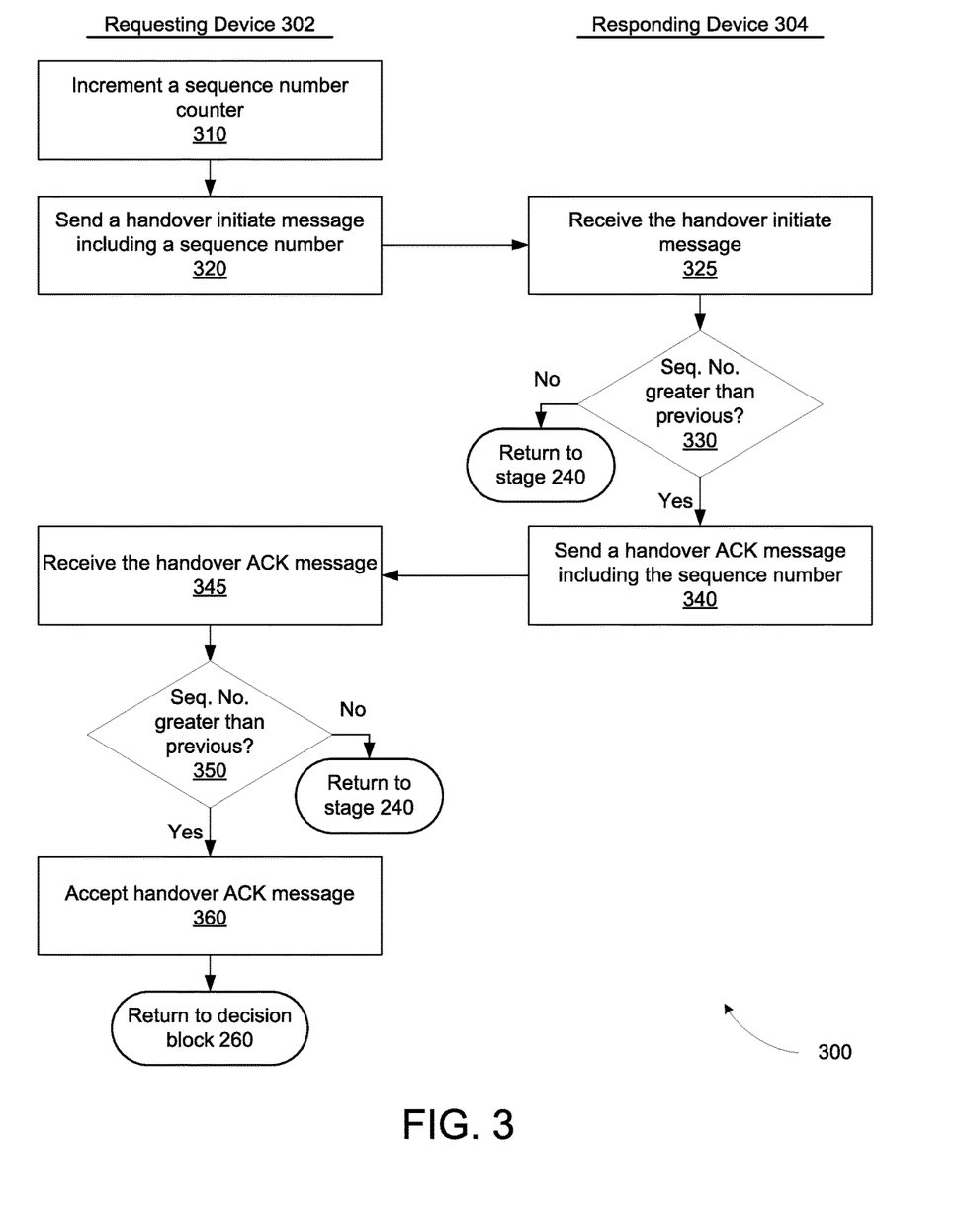
FIG. 3 is flowchart of an example method of using a sequence number scheme to avoid unwanted access network handovers, according to an illustrative implementation.

FIG. 3 is flowchart of an example method 300 of using a sequence number scheme to avoid unwanted access network handovers, according to an illustrative implementation. The method 300 can represent additional determinations that can be made when deciding whether the handover message exchange is proper (e.g., in stage 260 of the method 200). The method 300 includes incrementing a sequence number counter (stage 310), sending a handover initiate message including a sequence number corresponding to the current state of the sequence number counter (stage 320), receiving the handover initiate message (stage 325), determining whether the sequence number is greater than a sequence number included in a previously received handover initiate message (decision block 330). If the sequence number is not strictly greater than a sequence number included in a previously received handover initiate message, the method 300 can end and return to stage 240 of the method 200. If the sequence number is strictly greater than a sequence number included in a previously received handover initiate message, the method 300 includes sending a handover acknowledge message including the sequence number (stage 340), receiving the handover acknowledge message (stage 345), determining whether the sequence number is greater than a sequence number included in a previously received handover acknowledge message (decision block 350). If the sequence number is not strictly greater than a sequence number included in a previously received handover acknowledge message, the method 300 can end and return to stage 240 of the method 200. If the sequence number is strictly greater than a sequence number included in a previously received handover acknowledge message, the method 300 includes accepting the handover acknowledge message (stage 360). As with the method 200, the method 300 can be implemented symmetrically between the access gateway 110 and the UE 120. That is, either of the access gateway 110 and the UE 120 can maintain a sequence number counter and initiate a handover request. In the following description, the device that initiates the handover request will be referred to as the "requesting device 302," and the device that responds to the handover request will be referred to as the "responding device 304."

The method 300 includes incrementing a sequence number counter (stage 310). The requesting device 302 can maintain a sequence number counter. The sequence number counter increases monotonically, and can increment with every handover initiate message generated. In some implementations, the sequence number counter can run from 0 to 255. The sequence number counter can include a local roll-over counter "c" with an initial value of 0. Each time the sequence number counter rolls over from 255 to 0, the roll-over counter c can increment. Thus, the actual sequence number can be computed as equal to c*256+sequence number.

The method 300 includes sending a handover initiate message including a sequence number corresponding to the current state of the sequence number counter (stage 320). The requesting device 302 generates the handover initiate message including the sequence number, and sends it to the responding device 304. The sequence number included in the handover initiate message can be the raw sequence number; that is, not taking into account the local roll-over counter c.

The method 300 includes receiving the handover initiate message from the requesting device (stage 325) and determining whether the sequence number in the handover initiate message is greater than a sequence number included in a previously received handover initiate message (decision block 330). The responding device 304 stores, in a local memory, the value of the sequence number included in the last handover initiate message received. The responding device 304 receives the handover initiate message and compares the received sequence number to the value stored in the local memory. If the received sequence number is less than or equal to the stored value, the responding device 304 can ignore the handover initiate message, or respond to the requesting device with a handover acknowledge message containing a "reject" status-code. The method 300 will end and return to stage 240 of the method 200. The lower received sequence number value can indicate that the handover initiate message is stale, and may have been delayed in traffic. In the meantime, the responding device 304 may have already changed states due to a later-sent, but previously received, handover initiate message. Thus, responding to the current handover initiate message with the lower sequence number may result in an unnecessary or undesired active connection handover. If the received sequence number is greater than the stored value, the method 300 can continue to stage 340.

The method 300 includes sending a handover acknowledge message including the sequence number (stage 340). The responding device 304 can generate a handover acknowledge message, and include the sequence number in the message. This will be the same sequence number received with the latest handover initiate message. The responding device 304 can send the handover acknowledge message back to the requesting device 302.

The method 300 includes receiving the handover acknowledge message from the responding device (stage 345) and determining whether the sequence number in the handover acknowledge message is greater than a sequence number included in a previously received handover acknowledge message (decision block 350). The requesting device 302 stores in a local memory the value of the sequence number included in the last handover acknowledge message received. The requesting device 302 receives the handover acknowledge message and compares the received sequence number to the value stored in the local memory. If the received sequence number is less than or equal to the stored value, the requesting device 302 will ignore the handover acknowledge message. The method 300 will end and return to stage 240 of the method 200. The lower received sequence number value can indicate that the handover acknowledge message is stale, and may have been delayed in traffic. In the meantime, the requesting device 302 may have already changed states due to a later-sent, but previously received, handover acknowledge message. Responding to the current handover acknowledge message with the lower sequence number may result in an unnecessary or undesired active connection handover. If the received sequence number is greater than the stored value, the method 300 can continue to stage 360.

The method 300 includes accepting the handover acknowledge message (stage 360). The requesting device 302 has determined that the handover acknowledge message has been received in the proper sequence, and can thus be accepted, subject to any further determinations regarding the message's validity. The method 300 can end and return to decision block 260 of the method 200.

Figure 4:
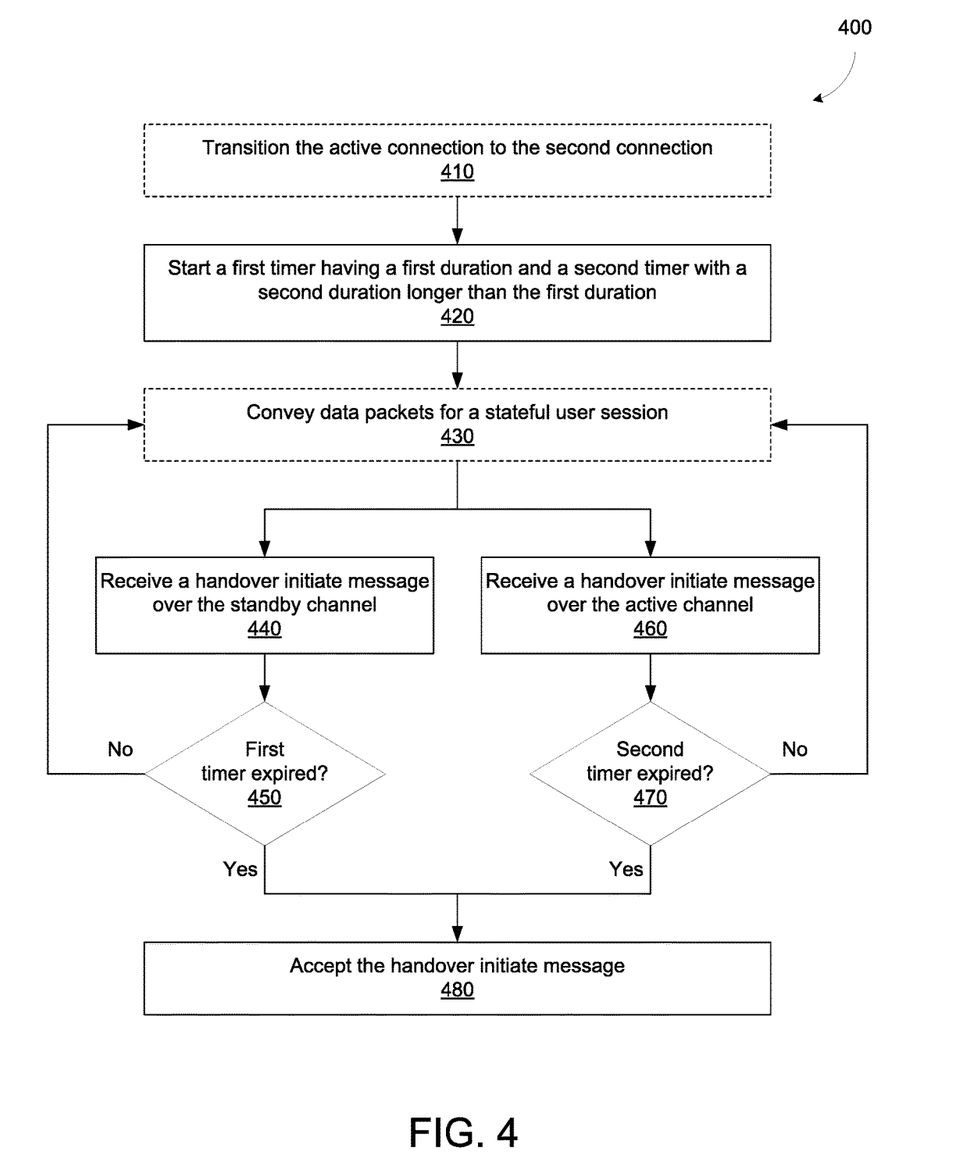
FIG. 4 is flowchart of an example method of using timers to avoid unwanted access network handovers, according to an illustrative implementation.

FIG. 4 is flowchart of an example method 400 of using timers to avoid unwanted access network handovers, according to an illustrative implementation. The method 400 can represent additional determinations that can be made when deciding whether the handover message exchange is proper (e.g., in stage 260 of the method 200). The method 400 can be performed by a responding device as it determines whether a handover initiate message is proper. The method 400 includes transitioning the active connection to the second connection (stage 410), starting a first timer having a first duration and second timer having a second duration longer than the first duration (stage 420), and conveying data packets for a stateful user session (stage 430). The method can then include either receiving a handover initiate message over the standby channel (stage 440) or receiving a handover initiate message over the active channel (stage 460). If the handover initiate message is received over the standby channel, the method 400 includes determining whether the handover initiate message received over the standby channel was received before the first timer expired (decision block 450). If the handover initiate message is received over the active channel, the method 400 includes determining whether the handover initiate message received over the active channel was received before the second timer expired (decision block 470). If the handover initiate message was received after expiration of the appropriate timer, the method 400 returns to stage 430. If the handover initiate message was received after expiration of the appropriate timer, the method 400 includes accepting the handover initiate message (stage 480).

The method 400 includes transitioning the active connection 150 to the second connection (stage 410). The method 400 starts at the point of a transition of the active connection to the access network corresponding to the previous standby connection. Thus the method 400 can start, for example, during stage 270 of the method 400.

The method 400 includes starting a first timer having a first duration and second timer having a second duration, which in some implementations is longer than the first duration (stage 420). One or both of the UE 120 and the access gateway 110 can begin their timers at the point of the previous active connection 150 handover. The timers can be set to appropriate values for preventing many unwanted handovers while allowing handovers to occur often enough to adapt to changes of network connection conditions occurring at typical intervals. For example, the first timer can be used to prevent a handover initiate message delayed in network transit from triggering an unwanted handover, while still allowing for a quick return to the previous active connection in the event the new active connection is not viable. Similarly, the second timer can be used to prevent overly frequent handovers. In some implementations, the first timer can be set to have a duration on the order of 1 second; however, any value from 0.1 s to 10 s or more may be appropriate. In some implementations, the second timer can be set to have a duration on the order of 1 minute; however any value from 1 s to 10 m or more may be appropriate. In some implementations, the second timer will have a longer duration than the first timer.

The method 400 includes conveying data packets for a stateful user session (stage 430). Following completion of the transition of stage 270 and the continuance of the stateful user session of stage 280, the method 200 can return to stage 240 and convey data packets for a stateful user session. Thus, stage 430 of the method 400 can overlap with stage 240 of the method 200.

If the responding device receives a handover initiate message over the standby channel, it will not accept the handover initiate message unless the first timer has elapsed. The responding device can use this check to ignore any residual packets that would otherwise cause an unwanted handover, while still allowing a relatively quick handover back to the previous active channel (i.e., the standby channel) in the event that the current active channel is not viable. This particular operation is not symmetric between the UE 120 and the access gateway 110. If the access gateway 110 is the responding device, the access gateway 110 can respond to any handover initiate messages received prior to expiration of the first timer with a handover acknowledge message having a "reject" status-code. For any handover initiate messages received by the access gateway 110 after expiration of the first timer, the access gateway 110 can respond with a handover acknowledge message having an "accept" status code, assuming all other conditions for the handover are met. If the UE 120 is the responding device, however, the UE 120 can disregard any packets received prior to expiration of the first timer, whether the packet is a handover initiate message or a data packet. For any packets received after expiration of the first timer, the UE 120 can respond with a handover acknowledge message with an appropriate status code. Accordingly, the method 400 can include receiving, by the responding device, a handover initiate message over the standby channel (stage 440). Upon receiving a handover initiate message over the standby channel, the method 400 includes determining, by the responding device, whether the handover initiate message received via the standby channel was received before the first timer expired (decision block 450). If the handover initiate message was received before the first timer expired, the responding device can disregard the handover initiate message, or respond to the requesting device with a handover acknowledge message containing a "reject" status-code. The method 400 can return to stage 430. If the first timer expired before the handover initiate message was received, the method 400 can continue to stage 480 and accept the handover initiate message.

If the responding device receives a handover initiate message over the active channel, it will not accept the handover initiate message unless the second timer has elapsed. The responding device can use the second timer to prevent overly frequent handovers, while still allowing handovers often enough to adapt to changes in network conditions occurring at typical rates. Accordingly, the method 400 can include receiving, by the responding device, a handover initiate message over the active channel (stage 460). Upon receiving a handover initiate message over the active channel, the method 400 includes determining, by the responding device, whether the handover initiate message received via the active channel was received before the second timer expired (decision block 470). If the handover initiate message was received before the second timer expired, the responding device can ignore the handover initiate message or respond to the requesting device with a handover acknowledge message containing a "reject" status-code. The method 400 can return to stage 430. If the second timer expired before the handover initiate message was received, the method 400 can continue to stage 480 and accept the handover initiate message.

The method 400 includes and accepting the handover initiate message (stage 480). The responding device has determined that the timing of the handover initiate message is reasonable, thus the handover initiate message can be accepted, subject to any further determinations regarding the message's validity. The method 400 can end and return to decision block 260 of the method 200.

Figure 5:
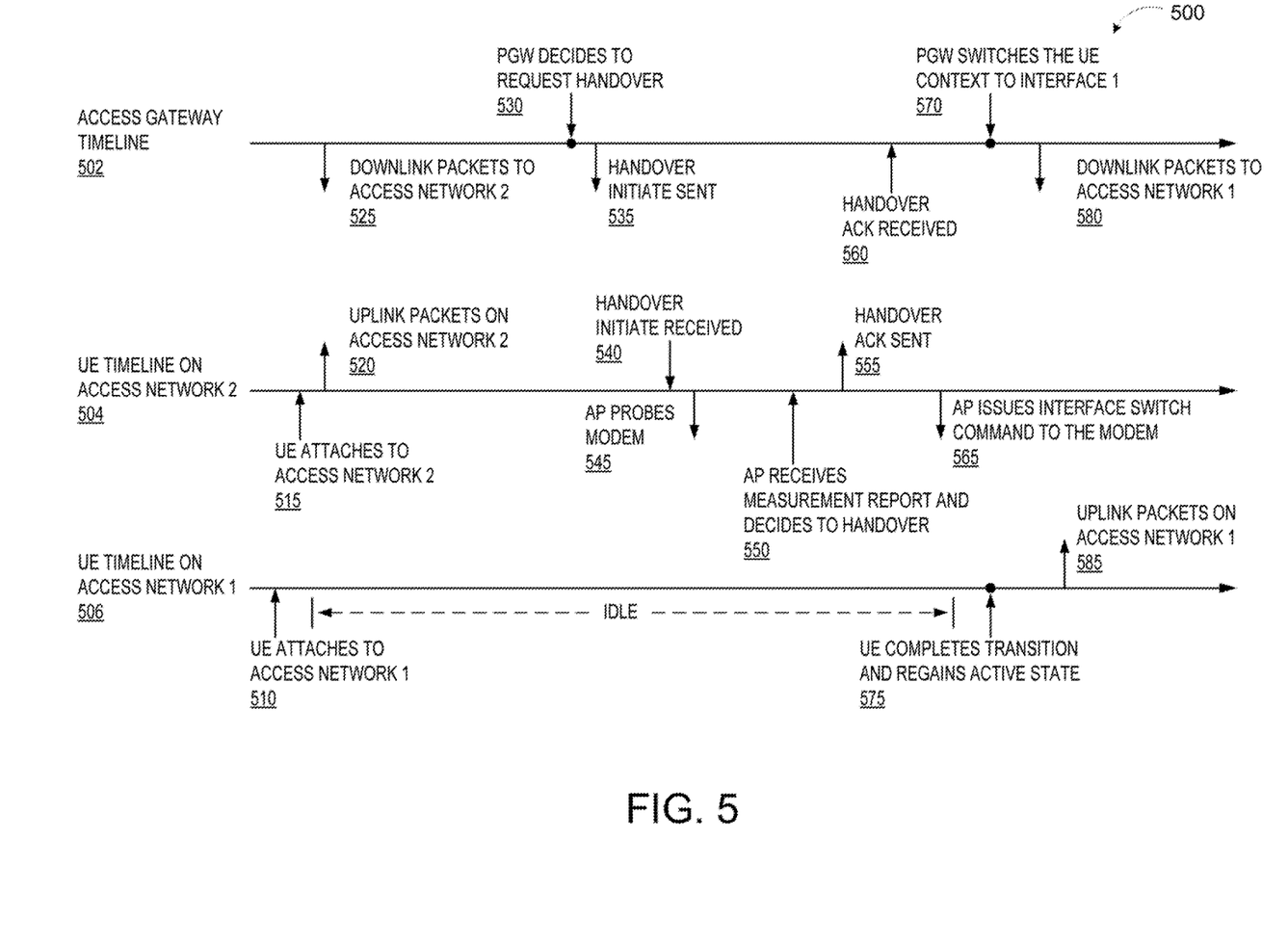
FIG. 5 shows a sequence of events for a handover, according to an illustrative implementation.

FIG. 5 shows an example sequence of events 500 for a handover, according to an illustrative implementation. The sequence 500 represents an example scenario in which a UE has a single Tx and Rx (Scenario 1). The sequence 500 illustrates an example access gateway 110-initiated handover conducted on a UE 120 initially connected on access network 1 130 and handed over to access network 2 140. The sequence 500 represents an example operation of the methods illustrated in FIGS. 2-4.

The sequence 500 is illustrated with three timelines: an access gateway 110 timeline 502, a first UE 120 timeline 504 representing UE actions with respect to access network 2, and a second UE 120 timeline 506 representing UE actions with respect to access network 1. The sequence 500 includes the UE attaching to the access network 1 (stage 510), the UE attaching to the access network 2 (stage 515), the UE uplinking packets on access network 2 (stage 520) and downlinking packets on access network 2 (stage 525), the access gateway (PGW) deciding to request a handover (stage 530), the PGW sending a handover initiate message (stage 535), the UE receiving the handover initiate message via access network 2 (stage 540), an application processor (AP) of the UE probing a modem of the UE (stage 545), the AP receiving a measurement report from the modem and deciding to handover communications to access network 1 (stage 550), the UE sending a handover acknowledgement message to the PGW via access network 2 (stage 555), the PGW receiving the handover acknowledgement message from the UE (stage 560), the AP issuing an interface switch command to the modem (stage 565), the PGW switching the UE context to interface 1 (stage 570), the UE completing the LTE service request and regaining the active state (stage 575), the PGW downlinking packets to the UE via access network 1 (stage 580), and the UE uplinking packets to the PGW via access network 1 (stage 585).

The sequence 500 includes the UE attaching to the access network 1 (stage 510). Stage 510 is similar to stage 210 of FIG. 2. During initialization, the UE attaches to access network 1 using the standard LTE procedure. The PGW assigns IP address IP1 for the UE's use in communicating over the packet data network (PDN). At this point, the UE is able to access the Internet (or make voice calls) using access network 1; however, for the purpose of illustration here, it is assumed that the UE does not transmit and receive data on access network 1. Rather, the connection on access network 1 remains idle after the UE discovers and attaches to access network 2.

The sequence 500 includes the UE attaching to the access network 2 (stage 515). Stage 515 is similar to stage 210 of FIG. 2. As another step in the initialization, the UE discovers and attaches to access network 2 using the standard LTE procedure. In order to do this, the UE has to switch the transmitter (Tx) and the receiver (Rx) of the UE to the radio parameters of a second access network, making the UE enter standby state on access network 1. This operation is similar to stage 230 of FIG. 2. The PGW can assign the same IP address IP1 for the UE's use in communicating over the PDN upon receiving the session setup request from access network 2, and accordingly can relocate the downlink forwarding context for the UE to access network 2. This is different from the normal multi-access PDN connectivity, in which each network attachment is provided with a unique IP address. At this point, the UE is able to access the Internet (or make voice calls) using access network 2.

The sequence 500 includes the UE uplinking packets on access network 2 (stage 520) and downlinking packets on access network 2 (stage 525). Stages 520 and 525 are similar to stage 240 of FIG. 2. The UE begins an Internet session using Tx and Rx on access network 2, receiving downlink packets from the PGW and sending uplink packets to the PGW. Periodically, the UE can retune its Rx to access network 1 to listen for any network information. The UE can also periodically retune the Tx to access network 1 when the Tx is idle on access network 2, and transmit keep-alive or diagnostic messages to the PGW.

The sequence 500 includes the access gateway (PGW) deciding to request a handover (stage 530) and the PGW sending a handover initiate message (stage 535). When there is a control event at the PGW, which results in the UE traffic being moved to access network 1, the PGW sends a handover initiate (HI) message to the UE on access network 2. At this point, the handover is in progress, but not yet complete. Accordingly, the PGW continues to forward downlink packets on Access Network 2. The sequence 500 includes the UE receiving the handover initiate message via access network 2 (stage 540).

The HI message is processed by an application processor (AP) of the UE. The sequence 500 includes the AP probing a modem of the UE (stage 545). Using an application programming interface (API), the AP may request for measurement report from the modem for interface 1 (corresponding to the modem's connection to access network 1), or it may use a recently cached report. The sequence 500 includes the AP receiving a measurement report from the modem and deciding to handover communications to access network 1 (stage 550).

The sequence 500 includes the UE sending a handover acknowledgement message to the PGW via access network 2 (stage 555). If the AP decides, based on its local logic, that the conditions are favorable for switching to access network 1, the AP sends a handover acknowledge (HA) with an "Accept" status-code to the PGW. If the AP decides that conditions are not favorable for a handover, the AP sends the HA message with a "Reject" status-code. Alternatively, the modem can decide whether to accept or reject the HI request based on policy configuration provided to the modem by the AP.

The sequence 500 includes the PGW receiving the handover acknowledgement message from the UE (stage 560). If the status-code is set to "Accept", the PGW waits for a configurable amount of time, and switches the active channel to access network 1. The configurable amount of time can be from several milliseconds to several seconds, and can allow for any in-progress traffic from the UE to reach the PGW. If the status-code is set to "Reject", the PGW continues to forward packets towards UE's access network 2. The handover message exchange of stages 535-560 are similar to stages 240 and 260 of FIG. 2. In some implementations, the handover message exchange of stages 535-560 can additionally include the sequence number and timer verification operations described in FIGS. 3 and 4.

The sequence 500 includes the AP issuing an interface switch command to the modem (stage 565). The AP waits for configurable amount of time after sending the HA message and switches the active interface by instructing the modem to direct the Tx and the Rx to access network 1. In some implementations, the AP can wait for an amount of time equal to about half of the round trip time (RTT) between the UE and the PGW. This pause allows the PGW time to receive the HA message and begin its own transition.

The sequence 500 includes the PGW switching the UE context to interface 1 (stage 570).

The sequence 500 includes the UE completing the transition and regaining the active state on access network 1 (stage 575). The modem retunes the Rx and Tx to access network 1, enabling the UE to send and receive traffic using interface 1. In some implementations, the AP sends a handover complete (HC) message using the newly active access network 1. This message serves to inform the PGW that the UE is active on access network 1, and provides failover in the event that the HA message is lost. Stages 565-575 are similar in operation to stage 270 of FIG. 2.

The sequence 500 includes the PGW downlinking packets to the UE via access network 1 (stage 580), and the UE uplinking packets to the PGW via access network 1 (stage 585). Stages 580 and 585 are similar in operation to the return of method 200 to stage 240 as shown in FIG. 2. If the handover occurs, the IP address remains the same on the new active access network. This allows existing user sessions to continue without having to restart the sessions. Moreover, the handover does not involve any other nodes (such as eNB, MME, SGW) to coordinate the procedure; it takes place using the end-end signaling between the UE and the PGW. Because of this, the handover latency is also expected to be short.

In some cases, the HI message sent by the PGW may be lost. If the PGW does not receive an HA message within a configurable HA_Receive_Timer, the PGW can retransmit the HI message (on the same interface as the original HI message, assuming that interface is still the active interface for the UE). In some implementations, the PGW may not retransmit the HI message more than a configurable HI_Rx_Times. If the AP receives a HI message while it is processing a previously received HI message, it can silently discard the duplicate HI message.

The above procedure also works for the case when a UE is capable of dual active receivers (Rx1, Rx2) and a single tunable transmitter (Tx) (Scenario 2). In this case, the PGW can use multiple downlink interfaces simultaneously for the same IP flow. However, the UE can only use a single interface for uplink. So, all application traffic from the UE to the PGW can only be sent on a single Tx interface. In such a scenario, the signaling from PGW can be used to change the uplink interface (from a standby to active and vice-versa).

Furthermore, the signaling illustrated in the sequence 500 is symmetric from the UE to the PGW as well. In other words, the handover initiation can be triggered by the UE. If the AP inside the UE decides to effect a handover of active session based on some local control logic, it can send an HI message to the PGW, which can similarly respond with an HA message with appropriate status-code. Once the HA message with Accept status-code is received, the AP then issues the switch command to the modem to retune the Rx and Tx. The PGW, on its side, switches the UE context to the previously standby interface after a configurable timer expires.

Figure 6:
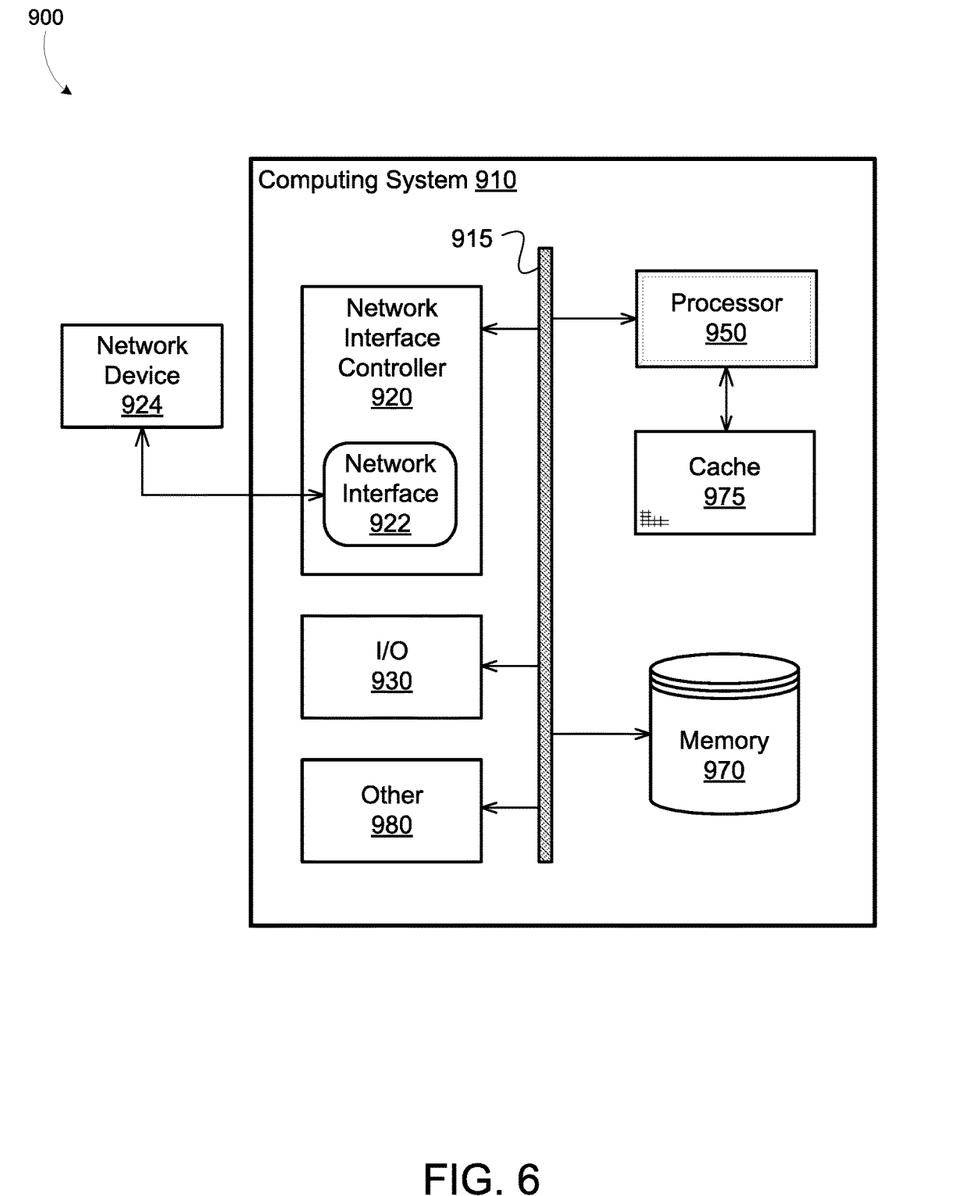
FIG. 6 is a block diagram illustrating a general architecture for a computer system that may be employed to implement elements of the systems and methods described and illustrated herein, according to an illustrative implementation.

FIG. 6 is a block diagram illustrating a general architecture for a computer system 900 that may be employed to implement elements of the systems and methods described and illustrated herein, according to an illustrative implementation. The computing system 900 may be utilized in implementing the methods of maintaining a user session during an access network handover shown in FIGS. 2-5.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with one or more network interface ports 922 connecting to one or more network devices 924, memory 970, and any other devices 980, e.g., an I/O interface. Generally, a processor 950 will execute instructions received from memory. The processor 950 illustrated incorporates, or is directly connected to, cache memory 975.

In more detail, the processor 950 may be any logic circuitry that processes instructions, e.g., instructions fetched from the memory 970 or cache 975. In many embodiments, the processor 950 is a microprocessor unit or special purpose processor. The computing device 900 may be based on any processor, or set of processors, capable of operating as described herein. In some implementations, the processor 950 can be capable of executing the methods of maintaining a user session during an access network handover shown in FIGS. 2-5. The processor 950 may be a single core or multi-core processor. The processor 950 may be multiple processors. In some implementations, the processor 950 can be configured to run multi-threaded operations. In some implementations, the processor 950 may host one or more virtual machines or containers, along with a hypervisor or container manager for managing the operation of the virtual machines or containers. In such implementations, the methods shown in FIGS. 2-5 can be implemented within the virtualized or containerized environments provided on the processor 950.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 900 may have any number of memory devices 970. In some implementations, the memory 970 can include instructions corresponding to the methods of maintaining a user session during an access network handover shown in FIGS. 2-5. In some implementations, the memory 970 supports virtualized or containerized memory accessible by virtual machine or container execution environments provided by the computing system 910.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922 (also referred to as network interface ports). The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. The network interfaces 922 are connection points for physical network links. In some implementations, the network interface controller 920 supports wireless network connections and an interface port 922 is a wireless receiver/transmitter. Generally, a computing device 910 exchanges data with other network devices 924 via physical or wireless links to a network interfaces 922. In some implementations, the network interface controller 920 implements a network protocol such as Ethernet.

The other network devices 924 are connected to the computing device 910 via a network interface port 922. The other network devices 924 may be peer computing devices, network devices, or any other computing device with network functionality. For example, a first network device 924 may be a network device such as a hub, a bridge, a switch, or a router, connecting the computing device 910 to a data network such as the Internet.

The other devices 980 may include an I/O interface, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 900 includes an additional device 980 such as a coprocessor, e.g., a math co-processor can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system for maintaining a user session during an access network handover, comprising an access gateway having a processor and a memory containing instructions causing the access gateway to:

establish a first connection with a user equipment over a first access network;

establish a second connection with the user equipment over a second access network such that the second connection and the first connection exist concurrently;
set the first connection as an active connection for conveying data packets for a stateful user session between the access gateway and the user equipment;
set the second connection as a standby connection;
exchange, with the user equipment over the active connection, a series of handover messages;
transition, subject to completion of the series of handover messages, the active connection to the second connection, wherein the access gateway includes a first interface storing a first user equipment context and communicating with the first access network, and a second interface storing a second user equipment context and communicating with the second access network, and wherein transitioning the active connection to the second connection comprises transferring the first user equipment context to the second interface;
set the first connection as the standby connection;
continue, over the second connection, the stateful user session between the access gateway and the user equipment such that a state of the stateful user session is maintained through the transition to the second connection;
start, upon transitioning the active connection to the second connection, a first timer having a first duration and a second timer having a second duration longer than the first duration;
for a handover initiate message received from the user equipment via the standby connection prior to expiration of the first timer, send a handover acknowledge message with a reject status-code; and
for a handover initiate message received from the user equipment via the active connection prior to expiration of the second timer, send a handover acknowledge message with a reject status-code.

2. The system of claim 1, wherein the user equipment comprises a first radio interface configured to connect to a small-cell network (SCN) and a second radio interface configured to connect to a macro cellular network (MCN).

3. The system of claim 1, wherein the access gateway maintains a same IP address for the active connection over the first connection and through the transition to the second connection.

4. The system of claim 1, wherein the access gateway is configured to monitor the standby connection for messages.

5. A system for maintaining a user session during an access network handover, comprising a user equipment having a processor and a memory containing instructions causing the user equipment to:
establish a first connection with an access gateway over a first access network;
establish a second connection with the access gateway over a second access network such that the second connection and the first connection exist concurrently;
set the first connection as an active connection for conveying data packets for stateful user session between the user equipment and the access gateway;
set the second connection as a standby connection;
exchange, with the access gateway over the active connection, a series of handover messages;
transition, subject to completion of the series of handover messages, the active connection to the second connection, wherein the access gateway includes a first interface storing a first user equipment context and communicating with the first access network, and a second interface storing a second user equipment context and communicating with the second access network, and wherein transitioning the active connection to the second connection comprises transferring the first user equipment context to the second interface;
set the first connection as the standby connection;
continue, over the second connection, the stateful user session between the user equipment and the access gateway such that a state of the stateful user session is maintained through the transition to the second connection;
start, upon transitioning the active connection to the second connection, a first timer having a first duration and a second timer having a second duration longer than the first duration;
for a handover initiate message received from the access gateway via the standby connection prior to expiration of the first timer, send a handover acknowledge message with a reject status-code; and
for a handover initiate message received from the access gateway via the active connection prior to expiration of the second timer, send a handover acknowledge message with a reject status-code.

6. A method of maintaining a user session during an access network handover, comprising:
establishing, by a user equipment, a first connection with an access gateway over a first access network;
establishing, by the user equipment, a second connection with the access gateway over a second access network such that the second connection and the first connection exist concurrently;
setting, by the user equipment, the first connection as an active connection for conveying data packets for stateful user session between the user equipment and the access gateway;
setting, by the user equipment, the second connection as a standby connection;
exchanging, between the user equipment and the access gateway over the active connection, a series of handover messages;
transitioning, subject to completion of the series of handover messages, the active connection to the second connection, wherein the access gateway includes a first interface storing a first user equipment context and communicating with the first access network, and a second interface storing a second user equipment context and communicating with the second access network, and wherein transitioning the active connection to the second connection comprises transferring the first user equipment context to the second interface;
setting, by the user equipment, the first connection as the standby connection;
continuing, over the second connection, the stateful user session between the user equipment and the access gateway such that a state of the stateful user session is maintained through the transition to the second connection;
starting, by the user equipment upon transitioning the active connection to the second connection, a first timer having a first duration and a second timer having a second duration longer than the first duration;
for a packet received from the access gateway via the standby connection prior to expiration of the first timer, disregarding the packet;
for a packet received from the access gateway via the standby connection after expiration of the first timer, sending a handover acknowledge message with an appropriate status-code; and for a handover initiate message received from the access gateway via the active connection prior to expiration of the second timer, sending a handover acknowledge message with a reject status-code.

7. The system of claim 5, wherein the user equipment comprises a single radio interface, and transitioning the active connection to the second connection comprises retuning the radio interface to the second access network.

8. The system of claim 5, wherein the user equipment communicates with the access gateway using a same IP address for the active connection over the first connection and through the transition to the second connection.

9. The system of claim 5, wherein the user equipment is configured to monitor the standby connection for messages.

10. A method of maintaining a user session during an access network handover, comprising:
establishing, by an access gateway, a first connection with a user equipment over a first access network;
establishing, by the access gateway, a second connection with the user equipment over a second access network such that the second connection and the first connection exist concurrently;
setting, by the access gateway, the first connection as an active connection for conveying data packets for a stateful user session between the access gateway and the user equipment;
setting, by the access gateway, the second connection as a standby connection;
exchanging, between the access gateway and the user equipment over the active connection, a series of handover messages;
transitioning, subject to completion of the series of handover messages, the active connection to the second connection, wherein the access gateway includes a first interface storing a first user equipment context and communicating with the first access network, and a second interface storing a second user equipment context and communicating with the second access network, and wherein transitioning the active connection to the second connection comprises transferring the first user equipment context to the second interface;
setting, by the access gateway, the first connection as the standby connection;
continuing, over the second connection, the stateful user session between the access gateway and the user equipment such that a state of the stateful user session is maintained through the transition to the second connection;
starting, by the access gateway upon transitioning the active connection to the second connection, a first timer having a first duration and a second timer having a second duration longer than the first duration;
for a handover initiate message received from the user equipment via the standby connection prior to expiration of the first timer, sending a handover acknowledge message with a reject status-code; and
for a handover initiate message received from the user equipment via the active connection prior to expiration of the second timer, sending a handover acknowledge message with a reject status-code.

11. The method of claim 10, comprising:
maintaining, by the access gateway, a same IP address for the active connection over the first connection and through the transition to the second connection.

12. The method of claim 10, comprising:
monitoring, by the access gateway, the standby connection for messages.

13. The method of claim 10, wherein exchanging the series of handover messages comprises:
incrementing, by the access gateway, a sequence number counter;
sending, from the access gateway to the user equipment, a handover initiate message including a sequence number corresponding to a current state of the sequence number counter;
receiving, at the access gateway from the user equipment, a handover acknowledge message including the sequence number, the user equipment sending the handover acknowledge message subject to a determination that the sequence number is greater than a previous sequence number included in a previously received handover initiate message; and
accepting, by the access gateway, the handover acknowledge message subject to a determination that the sequence number is greater than a sequence number included in a previously received handover acknowledge message.

14. The system of claim 6, wherein the user equipment comprises a first radio interface configured to connect to a small-cell network (SCN) and a second radio interface configured to connect to a macro cellular network (MCN).

15. The method of claim 6, comprising:
maintaining, by the access gateway, a same IP address for the active connection over the first connection and through the transition to the second connection.

16. The method of claim 6, comprising:
monitoring, by the access gateway, the standby connection for messages.

17. The method of claim 6, wherein exchanging the series of handover messages comprises:
incrementing, by the user equipment, a sequence number counter;
sending, from the user equipment to the access gateway, a handover initiate message including a sequence number corresponding to a current state of the sequence number counter;
receiving, at the user equipment from the access gateway, a handover acknowledge message including the sequence number, the access gateway sending the handover acknowledge message subject to a determination that the sequence number is greater than a previous sequence number included in a previously received handover initiate message; and
accepting, by the user equipment, the handover acknowledge message subject to a determination that the sequence number is greater than a sequence number included in a previously received handover acknowledge message.

* * * * *